United States Patent
Candelore

(10) Patent No.: US 8,000,972 B2
(45) Date of Patent: Aug. 16, 2011

(54) REMOTE CONTROLLER WITH SPEECH RECOGNITION

(75) Inventor: Brant L. Candelore, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 963 days.

(21) Appl. No.: 11/977,776

(22) Filed: Oct. 26, 2007

(65) Prior Publication Data

US 2009/0112592 A1 Apr. 30, 2009

(51) Int. Cl.
*G10L 15/00* (2006.01)
*G10L 21/00* (2006.01)
*G06F 3/048* (2006.01)
*G10L 11/00* (2006.01)

(52) U.S. Cl. ......... 704/275; 704/231; 704/270; 715/835
(58) Field of Classification Search .................. None
See application file for complete search history.

(56) References Cited

U.S. PATENT DOCUMENTS

| | | | |
|---|---|---|---|
| 5,774,859 A * | 6/1998 | Houser et al. ............... | 704/275 |
| 6,314,398 B1 * | 11/2001 | Junqua et al. .............. | 704/257 |
| 6,643,620 B1 | 11/2003 | Contolini et al. | |
| 6,889,191 B2 * | 5/2005 | Rodriguez et al. ........... | 704/275 |
| 6,901,366 B1 * | 5/2005 | Kuhn et al. ................. | 704/275 |
| 2001/0049826 A1 * | 12/2001 | Wilf .......................... | 725/120 |
| 2002/0120925 A1 * | 8/2002 | Logan ....................... | 725/9 |
| 2002/0144293 A1 * | 10/2002 | Dimitrova et al. ........... | 725/133 |
| 2003/0103088 A1 * | 6/2003 | Dresti et al. ................ | 345/835 |
| 2004/0111745 A1 | 6/2004 | Schein et al. | |
| 2005/0132420 A1 * | 6/2005 | Howard et al. .............. | 725/135 |
| 2005/0144009 A1 * | 6/2005 | Rodriguez et al. ........... | 704/275 |
| 2006/0075429 A1 * | 4/2006 | Istvan et al. ................ | 725/39 |
| 2010/0313169 A1 * | 12/2010 | Huang et al. ............... | 715/835 |

OTHER PUBLICATIONS

"The Prospects for Unrestricted Speech Input for TV Content Search," Wittenburg et al.; Mitsubishi Electric Research Laboratories; May 2006.
"A Spoken Dialogue System for Electronic Program Guide Information Access," Kim et al.; Dept. Of Computer Science and Engineering, Pohang University of Science and Technology, South Korea; Aug. 2007.
"SPICE: A Multimodal Conversational User Interface to an Electronic Program Guide," Kellner et al.; Phillips Research Laboratories Aachen; Jun. 2002.
"The Surfboard Universal Remote Control with Voice Operation," User Guide; V.09a; Jun. 2006.
"OEM-Ready SimpleRemote," Open Peak website; 2006.
"Voice Operated Remote Control for OEMs," Innotech Systems Inc.; 2003.

* cited by examiner

*Primary Examiner* — Justin Rider
(74) *Attorney, Agent, or Firm* — Miller Patent Services; Jerry A. Miller

(57) ABSTRACT

A receiver remote controller has a storage device storing electronic program guide (EPG) data that relates content to television channels containing said content. The remote controller is contained in a remote controller housing with the housing containing: a data interface that receives the EPG data provided by an EPG data source for storage in the storage device; a speech interface that receives speech input from a user and produces speech signals therefrom; a natural language speech processor engine that receives the speech signals and translating the speech signals to a query of the EPG database; and a processor that receives results of the query from the natural language speech processor, and either conveys the results of the query to a user utilizing a user interface or sends navigation commands to the receiver. This abstract is not to be considered limiting, since other embodiments may deviate from the features described in this abstract.

22 Claims, 5 Drawing Sheets

US 8,000,972 B2

REMOTE CONTROLLER WITH SPEECH RECOGNITION

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

Television remote controllers are conventionally used to navigate a television system's electronic program guides (EPGs) remotely. However, this can be a cumbersome process and normally involves simply scrolling through either an organized or unorganized set of channels and browsing descriptions in order to identify a desired program. Alternatives to this may permit entry of search queries by text entry. However, this is also cumbersome for some due to the small size of the keyboard or possibly some other physical condition which makes entry of such queries difficult. Speech processing remote controllers are available on the market but simply use speech recognition to simulate button presses on the remote controller.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
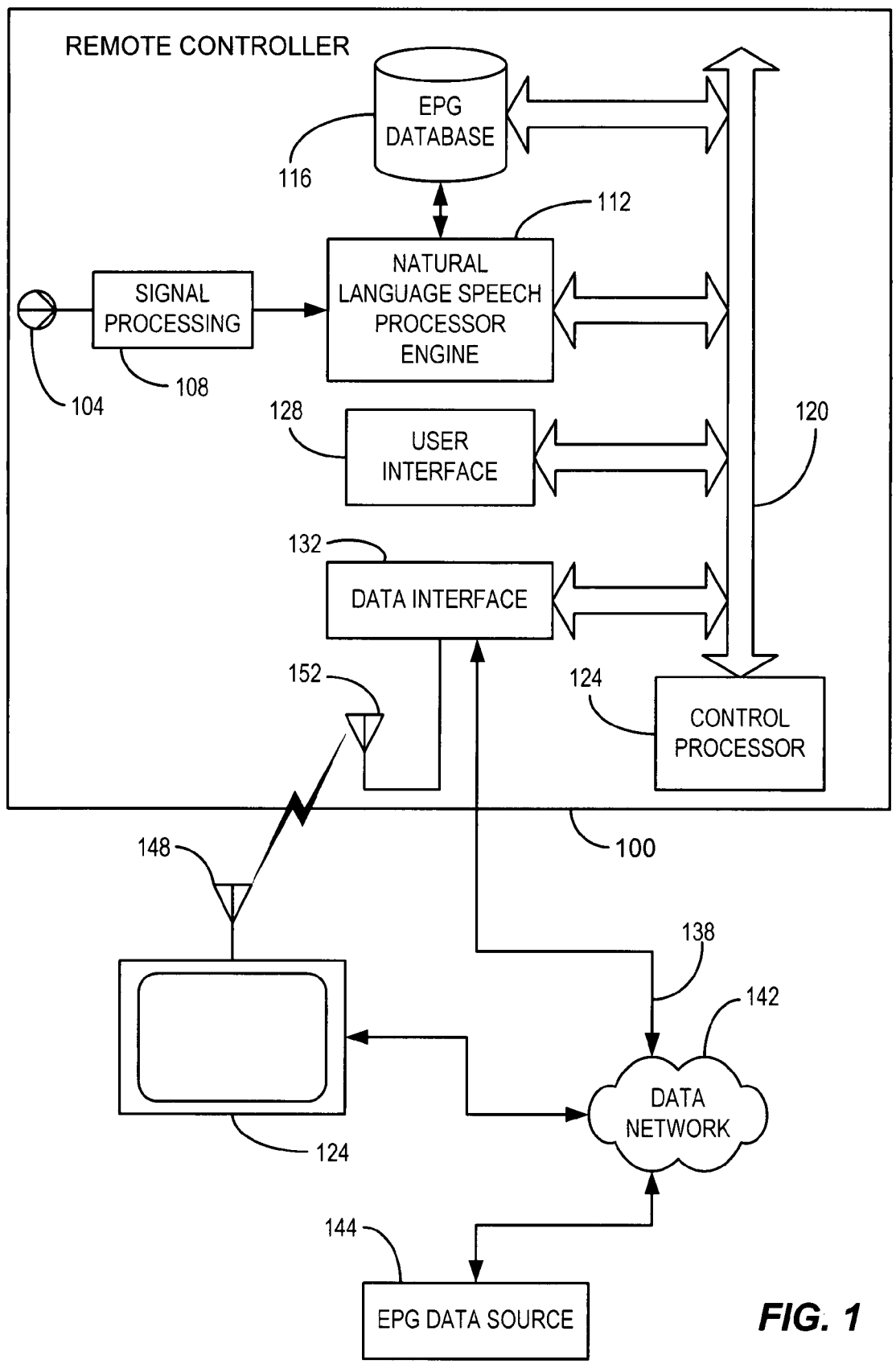
FIG. 1 is a block diagram of an exemplary remote controller system consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system. The term "program", as used herein, may also be used in a second context (the above definition being for the first context). In the second context, the term is used in the sense of a "television program". In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In accordance with certain embodiments, the invention relates to a receiver remote controller for providing a channel or program of a user's interest based on a prompt from the user. The receiver could be cable, satellite, IPTV, broadcast TV adapter or broadcast television. In the discussion below the description will be in regard to a television, however, the embodiments would just as well with the other receiver types. There are two methods for the receiver remote controller to recognize voice input. In the first method, the receiver remote controller uses a voice recognition technique in combination with a electronic dictionary to recognize the prompt from the user. It can then use text recognized from the user's prompt for searching a database of Electronic Program Guide (EPG) information. In the second method, the receiver remote controller analyzes the sound patterns of the voice input and compares that to sound tags delivered with the EPG database. Depending on the correlation, matches that are close enough will be presented to the user for resolution, as discussed later, or if sufficiently close enough match is made, the remote controller simply acts on the voice input.

Turning now to FIG. 1, an exemplary embodiment of a remote controller device 100 is depicted wherein the elements shown inside block 100 are integrated into the remote control device itself and are not external thereto. In this illustrative embodiment, voice recognition technology may be used to search for channel names to help simplify navigation of an electronic program guide (EPG) and to facilitate tuning. For example, someone could simply say "CNN" in order to initiate a search (perhaps in combination with pressing a button on the remote controller 100 or by preceding the query with a key word, so that spurious sounds do not trigger a search). The remote controller would identify it in the EPG database by auto-correlating the voice input with a template sound tag associated with an associated virtual channel number to facilitate navigating the EPG or tuning. For example, "CNN" would be processed by the natural language speech processor engine 112 and compared with a template voice tag for each channel. So, for example, if there is match for virtual channel "202", the remote can then send RF or IR commands "2", "0" and "2". If the EPG is displayed by the receiver, this will center the channel "202" in the middle of the EPG. If video is displayed, then this would effectuate a channel change to channel "202". Voice recognition with dictionary word comparison can be used to match a query word or phrase against selected text from the EPG data. The query text can be not only program names but also actors, directors, and terms used in the EPG's synopsis. This approach precludes the need to type text into a search box, which can be cumbersome to operate due to the size of the keyboards associated with remote controllers.

In FIG. 1, remote controller 100 incorporates a microphone 104 that is processed by amplification, filtering and analog to digital conversion at signal processor 108 to produce a digitized speech signal that can be interpreted by a natural language speech processing engine 112. Engine 112 can be implemented in many ways including programmed processor(s) and dedicated hardware devices without limitation. The natural language speech processing engine 112 is in communication with an EPG database stored on a storage device 116 such as a disc drive or flash memory element. The EPG database at 116 can thereby be queried by the natural language speech processing engine 112 for matches to queries that are spoken and received at microphone 104 by a user attempting to make a query. In one embodiment, the EPG database can simply contain a list of channel name text and associated virtual channel numbers. Or, in other embodiments, the EPG database can contain default channel voice tags (to be used for comparison) and associated virtual channel number. Virtual channel numbers are relatively static and could help with basic navigation. Those skilled in the art will also appreciate, upon consideration of the present teachings, that the EPG database could also contain any or all of the contents of any suitable modern EPG (e.g., program metadata). This data is should, in most embodiments, be updated on a regular basis, e.g. every two to three days.

Communication between the natural language speech processing engine 112 and the EPG database 116 may be carried out over a communication bus 120 or by a direct connection to the database or by use of any other suitable interface. The operation of the remote controller is overseen and controlled by a control processor 124 via the communication bus 120.

The control processor 124 can also receive input from and produce output to a user interface 128 that incorporates, for example, a collection of control keys that operate in a conventional manner, and optionally a display. However, as used herein, the term user interface can take on multiple meanings. In the context of various embodiments, a television remote controller may have, for example, a keypad, a microphone input and a display—each of which constitute a portion of the user interface. The remote controller may also act in combination with a television display or monitor (terms used interchangeably herein) so as to produce a distributed interface with the display being used to convey, for example, a menu of items that can be selected by the user as a portion of the processes described. Hence, the distributed user interface can be considered equivalent in many respects to a unitary user interface confined to the remote control for purposes of this discussion.

A data interface 132 is also provided in communication with bus 120. This data interface 132 as depicted can represent a wireless interface or plurality of wireless interfaces for both television commands (channel change, volume, channel selection, menu selections, etc.) directed at a television device such as 134 as well as an interface for requesting and/or receiving EPG updates either from the TV receiver device 134 (e.g., television set, set top box, set back box, etc.) or via an interconnection 138 to the Internet or other data network 142 that accesses an EPG data source 144.

Communication between the remote controller 100 and the television device 134 can be carried out using, for example, either radio frequency (RF) communications as illustrated with antennas 148 and 152 or via infrared (IR) communication techniques. In many instances, a television set top box or set back box serves as an interface with either a cable television network or satellite network and communication is carried out with such devices in order to retrieve EPG data. However, independent communication, either with a wired connection 138 or a wireless connection to an auxiliary device (not shown—e.g. IP router or USB connection to a PC which has a network connection) in order to facilitate downloading of a copy of the metadata that is used to create the EPG database is contemplated. Such data can be either obtained directly or indirectly from the television service provider or from an alternative source without limitation.

The TV device 134 depicted represents any television receiver device including, but not limited to, television interface boxes, set top boxes, set back boxes, television receivers, etc. and combinations thereof. Moreover, for purposes of supplying the EPG metadata that is stored at 116 and variations thereof, the TV receiver device 134 can be viewed as a device that stores or retrieves and supplies the metadata, whether an authorized device associated with the service provider's network, or any other source of EPG metadata.

Figure 2:
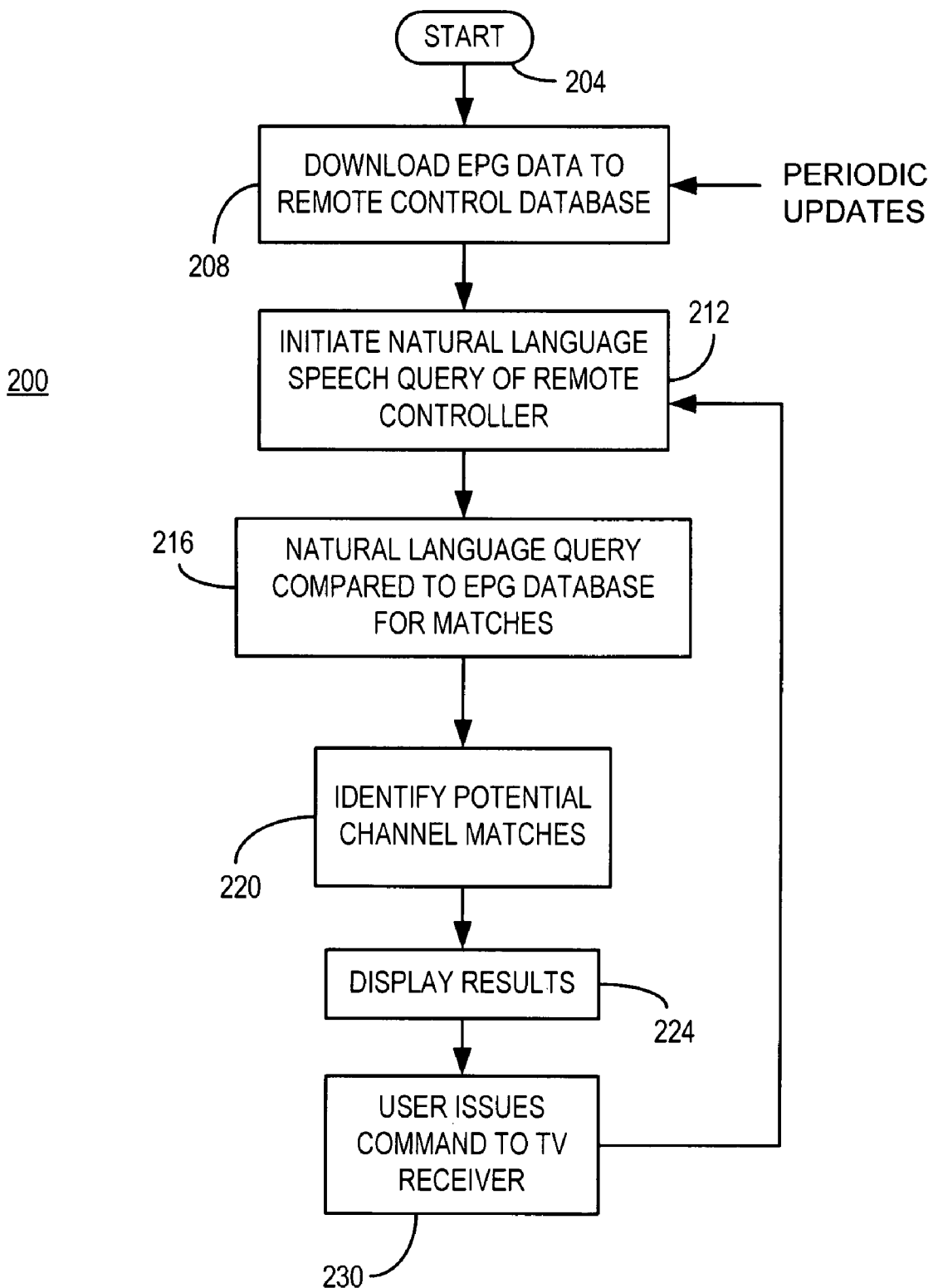
FIG. 2 is a flow chart of an exemplary process consistent with certain embodiments of the present invention.

Referring now to FIG. 2, an exemplary process 200 for implementing an embodiment consistent with the present invention is depicted starting at 204. At 208, EPG metadata are downloaded from a suitable source to the remote controller database. This data, as indicated, are periodically updated or may in other embodiments be updated on demand from the user or the system on an as needed basis.

At 212, the user initiates a natural language speech query of the remote controller 100. This action can be carried out by either simply speaking a search query into the remote controller, or more preferably, by taking an action indicative that the spoken text is to be interpreted as a query prior to or during the speaking of the search term or terms. In one embodiment, this can be accomplished by pressing a "query" button simultaneously with the speaking of the query. Such button can serve simply to enable the microphone or may otherwise signal that the speech is to be interpreted as a query and not ignored.

In another embodiment, the user can precede a query with speaking an "attention term" that "wakes up" the remote controller to reception of the query. In this case, the remote controller is continuously monitoring sounds for receipt of the "attention term". By way of example, one attention term might be the words "remote query" followed by a word or group of words to be searched. This initiates the natural language speech query process. A second term, such as "end" or "query over" may be used to end the query, or simply a timeout or pause in audio can be used to end the query.

In any case, the query speech is received by the natural language speech processor engine 112 and the query is conducted of the EPG database 116 at 216 to identify potential matches. Many possible actions are possible at this point, with the actions described being among several. As depicted in process 200, potential matches are identified at 220 and the results can be displayed in a menu format at 224. The user can then use conventional scrolling and selecting controls from the remote controller 100's user interface 128 to make a selection of a desired television program or take other action by issuing a command at 230. The process then returns to 212 to await a new speech command.

In other embodiments, if a single match is identified and the match is currently valid (e.g., if the search results in a program that is currently airing), an alternative action is to simply change channels to the virtual channel represented by the query results. Another viable action, if the program is not currently valid but will be valid in the future (e.g., a movie that airs in the middle of the night) a suitable action might be to create a timer to record the program on a PVR device or other storage device. Other possibilities will occur to those skilled in the art upon consideration of the present teachings.

Hence, ease of searching the EPG is enhanced and the searching can be for any number of items that are contained in the text of an EPG, such as for example, finding networks, or finding programs with a particular actor, director or with a particular plot that can be characterized by a natural language query (e.g., murder, comedy, mystery, or more complex queries). By use of voice recognition in combination with a local database of EPG metadata, the user can avoid the need to tediously key-in text commands which is typically difficult for remotes with the usual 10-key, channel up-down, volume up-down and input buttons, or other keyboard format that is designed to be compact. So called "soft keyboards" displayed on-screen are also typically slow and cumbersome for the user to utilize.

In certain embodiments, the remote controller can have the EPG database. The remote would have voice recognition capability in order to do search. The remote would have an LCD display to render results and for the user to select. If tuning a program, the remote might tune directly and not show choices in the LCD display. In other embodiments, other displays can be utilized including the main or picture in picture display of the television display.

Figure 3:
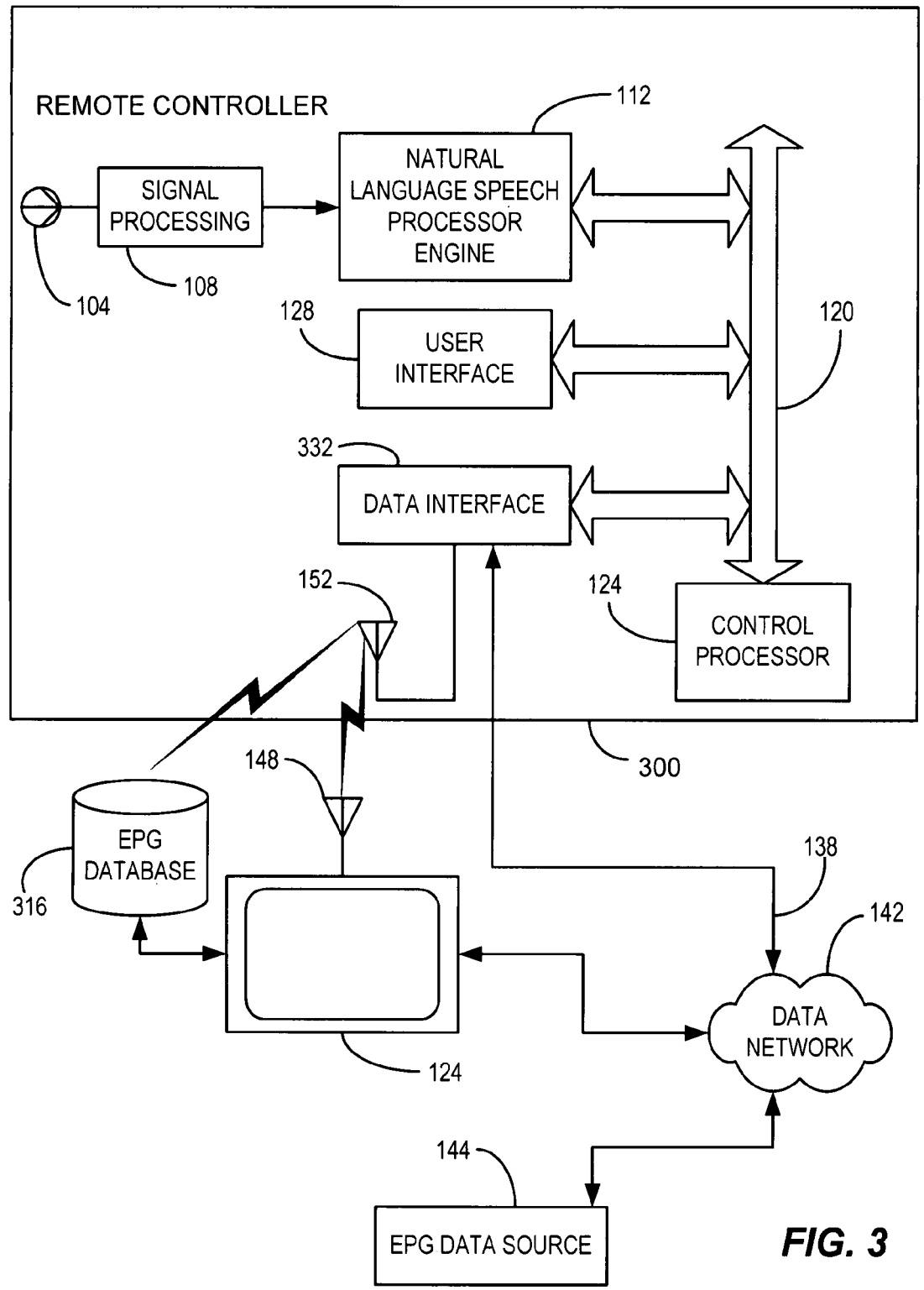
FIG. 3 is a block diagram of another exemplary remote controller system consistent with certain embodiments of the present invention.

Referring now to FIG. 3, another exemplary embodiment consistent with the present invention is depicted in which the EPG database 316 and associated storage device resides external to the remote controller 300. Commonly number elements work in a manner similar to that of FIG. 1, except that the search is carried out at a remote EPG. In the embodiment, queries of the EPG database are still conducted by the remote controller; however, the database 316 and associated storage device are queried using the data interface 332. In still other embodiments, the database may be remotely located such as the EPG data source 144 and may be queried directly rather than utilizing local storage of metadata downloaded from the EPG data source 144. Other variants will occur to those skilled in the art upon consideration of the present teachings.

Hence, the EPG metadata can be stored in the remote control or in the television receiver device (e.g., TV receiver, set-top box or set back box, or other external site).

Figure 4:
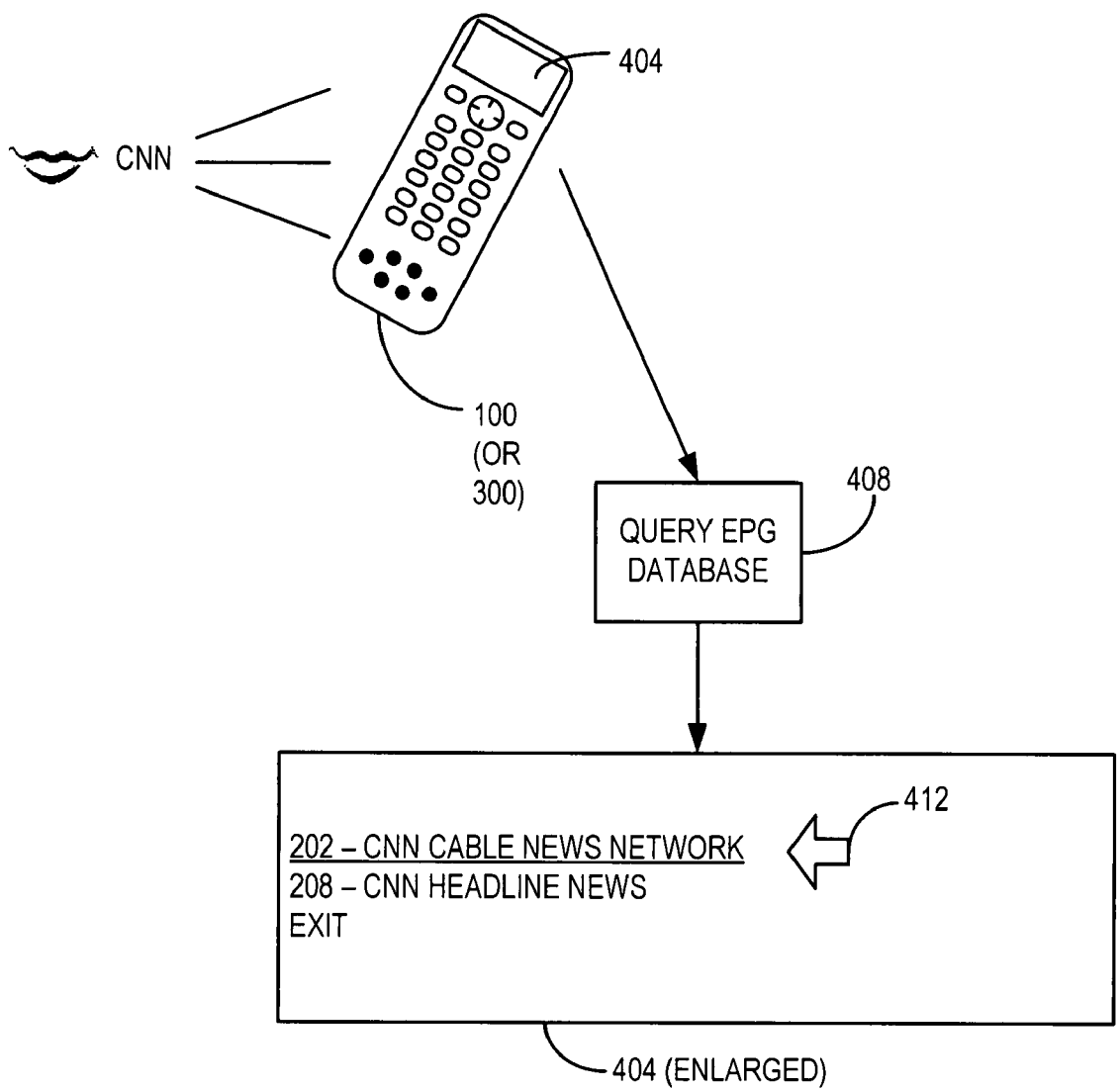
FIG. 4 is an illustrative example of a first search consistent with certain embodiments of the present invention.

Referring now to FIG. 4, an example query is depicted wherein the search term "CNN" is spoken by a user to remote controller 100 (or 300). In this example, the remote controller 100 includes a display 404. The natural language search engine carries out a search at 408 and produces a display on 404 shown enlarged with two "hits"—one with virtual channel 202 and one with virtual channel 208. The user can then utilize the remote controller's user interface keys to navigate to the desired selection. Voice commands having specific spoken words associated therewith may, for example, be used to move a cursor "up", "down", "left", "right", "cancel", "exit", "enter" and "select". Other spoken commands that may be recognized, such as "channel up", "channel down", "guide", "volume up", "volume down" or other direct commands such as might be found either on a remote controller or a menu selection may be provided, as will be clear to those skilled in the art upon consideration of the present teachings. Again, it is noted that a suitable mechanism such as a keyword or actuation of a microphone may be advantageous to prevent the remote controller and system from acting on inadvertent use of the voice commands in conversation unrelated to a desired command entry. In one embodiment, this may involve a change in a displayed highlighting, bolding, underlining or other indication by text change of the desired selection. In other embodiments, a cursor 412 or pointer can be moved to indicate the desired selection including an "exit" selection. In this case, the two hits correspond to two networks that are affiliated with CNN™ and represent a search for a network.

Figure 5:
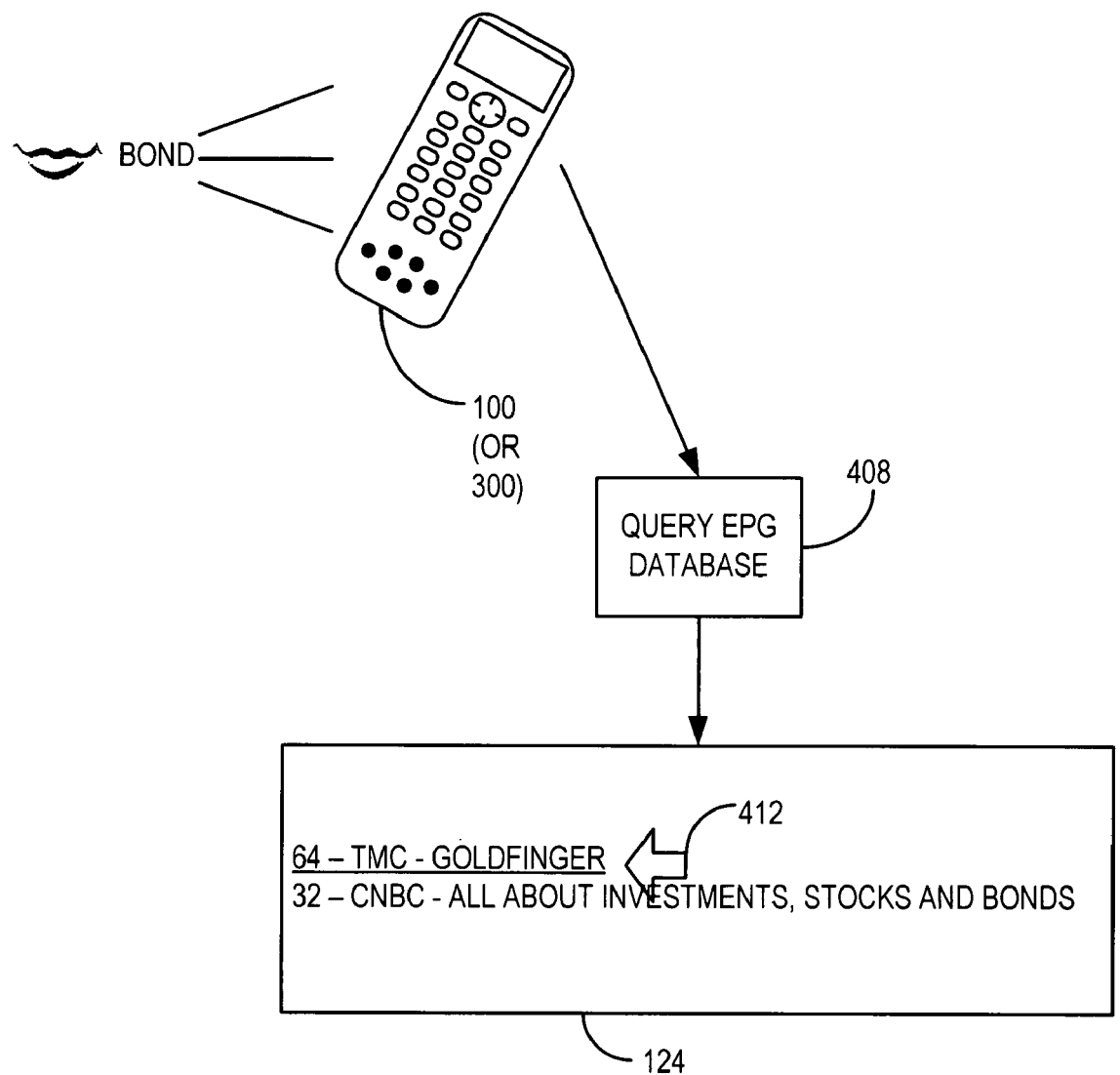
FIG. 5 is an illustrative example of a second search consistent with certain embodiments of the present invention.

Another alternative is depicted in FIG. 5, in which the query term "bond" could result in an ambiguous search of the metadata. In one case, the term could correspond to a "James Bond" movie, and in the other instance, the search term could represent a financial instrument a "bond". In this case, the results are also depicted as being viewed on the television display device 134. However, in either case, the user can simply make a selection, using the remote controller's user interface keys or by way of spoken voice command, based on the results or exit (using an appropriate key or spoken command) if neither result is suitable.

Thus, in certain embodiments, a receiver remote controller has a storage device storing electronic program guide (EPG) data that relates content to television channels containing said content. The remote controller is contained in a remote controller housing with the housing containing: a data interface that receives the EPG data provided by an EPG data source for storage in the storage device; a speech interface that receives speech input from a user and produces speech signals therefrom; a natural language speech processor engine that receives the speech signals and translating the speech signals to a query of the EPG database; and a processor that receives results of the query from the natural language speech processor, and either conveys the results of the query to a user utilizing a user interface or sends navigation commands to the receiver.

In certain embodiments, the user interface further has a display on the remote controller. In certain embodiments, the remote controller is in communication with a receiver display, and wherein the user interface includes a circuit for producing a display of results of the query on the receiver output display. In certain embodiments, the remote controller also has a remote command transmitter that transmits a command from the remote controller, such command including a program selection selected by manual or voice input via the user interface as a result of the query. In certain embodiments, the data interface includes a wireless interface that couples data to the remote controller device. In certain embodiments, the data interface includes a wireless interface for issuing commands to a receiver. In certain embodiments, the data interface includes a wired interface. In certain embodiments, the EPG data are updated on a periodic basis by connection to the EPG data source. In certain embodiments, the storage device storing the EPG is situated within the remote controller. In certain embodiments, the storage device storing the EPG is situated outside the remote controller, and the query is carried out via the data interface. In certain embodiments, the remote controller includes a circuit for signaling to the remote controller that the speech input is to be interpreted as an EPG query or command. In certain embodiments, the receiver comprises one of a cable set-top box, satellite set-top box, IPTV set-top box, broadcast TV adapter, and broadcast television.

In other embodiments, a receiver remote controller is contained in a remote controller housing containing: a storage device storing electronic program guide (EPG) data that relates content to receiver channels containing said content; a wired or wireless data interface that receives the EPG data from an EPG data source for storage in the storage device; a user interface including a local or receiver display; a speech interface that receives speech input and converts the speech input to a speech signal; a circuit for signaling to the remote controller that the speech input is to be interpreted as an EPG query; a natural language speech processor engine receiving the speech signal and creating a query of the EPG database; a processor that receives results of the query from the natural language speech processor conveys the results of the query to a user utilizing the user interface; a remote command transmitter that transmits a command from the remote controller, such command comprising a program selection selected by manual or voice input via the user interface as a result of the query; and a data interface for receiving the EPG data provided by an EPG data source for storage in the storage device.

In certain embodiments, the remote controller is in communication with a receiver display, and wherein the user interface further has circuitry for producing a display of results of the query on the receiver display. In certain embodiments, the EPG data are updated on a periodic basis by connection to the EPG data source.

In other embodiments, a method of processing electronic program guide (EPG) queries involves receiving EPG data from an EPG data source; storing electronic program guide (EPG) data in a data storage device within the remote controller, the EPG relating content to television channels containing said content; in a remote controller: receiving speech input at a speech input of the remote controller; at a natural language speech processor engine within the remote controller, receiving the speech input and translating the speech input to a query of the EPG database; and at a processor within the remote controller, receiving results of the query from the natural language speech processor and either conveying the results of the query to a user utilizing a user interface or transmitting navigation commands to a receiver.

In certain embodiments, the method further involves displaying the results of the query on a display forming a part of the remote controller. In certain embodiments, the remote controller is in communication with a receiver output display, and further comprising producing a display of results of the query on the receiver output display. In certain embodiments, the method further involves transmitting a command from the remote controller, such command including a program selection selected by manual voice input via the user interface as a result of the query or command. In certain embodiments, the data interface comprises a wireless interface that couples data to the remote controller device. In certain embodiments, the storage device storing the EPG is situated outside the remote controller, and the query is carried out via the data interface. In certain embodiments, the data interface involves a wired interface. In certain embodiments the method further involves updating EPG data on a periodic basis by connection to the EPG data source. In certain embodiments, the storage device storing the EPG is situated within the remote controller. In certain embodiments, the method further involves signaling to the remote controller that the speech input is to be interpreted as an EPG query or command.

In another method of carrying out a query on an Electronic Program Guide (EPG) database useful for use with a receiver remote controller with voice recognition capability, the method involves storing the EPG database, said database containing channel names, virtual channel numbers, and sound tags associated with the channel names and virtual channel numbers; at the receiver remote controller, receiving a voice query; and correlating the voice query to the sound tags forming part of the EPG database to identify actions that are potentially associated with the voice query.

In certain embodiments, the database further contains information and associated sound tags for one or more of the following: program schedule, program name, actor, and program synopsis.

Other embodiments will occur to those skilled in the art upon consideration of the present teachings.

Those skilled in the art will recognize, upon consideration of the above teachings, that certain of the above exemplary embodiments are based upon use of a programmed processor. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Certain embodiments described herein, are or may be implemented using a programmed processor executing programming instructions that are broadly described above in flow chart form that can be stored on any suitable electronic or computer readable storage medium and/or can be transmitted over any suitable electronic communication medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain embodiments herein were described in conjunction with specific circuitry that carries out the functions described, other embodiments are contemplated in which the circuit functions are carried out using equivalent embodiments executed on one or more programmed processors. General purpose computers, microprocessor based computers, micro-controllers, optical computers, analog computers, dedicated processors, application specific circuits and/or dedicated hard wired logic and analog circuitry may be used to construct alternative equivalent embodiments. Other embodiments could be implemented using hardware component equivalents such as special purpose hardware and/or dedicated processors.

While certain illustrative embodiments have been described, it is evident that many alternatives, modifications, permutations and variations will become apparent to those skilled in the art in light of the foregoing description.

What is claimed is:

1. A television receiver remote controller, comprising in combination:
   a first storage device storing electronic program guide (EPG) data as an EPG database that relates content to television channels containing said content, the first storage device forming a part of a television receiver device;
   the remote controller being contained in a remote controller housing, the housing containing:
   a second storage device;
   a data interface that receives the EPG database from the first storage device forming a part of the television receiver device and stores the EPG database on the second storage device;
   a speech interface that receives speech input from a user and produces speech signals therefrom;
   a natural language speech processor engine that receives the speech signals and translates the speech signals to a query of the EPG database stored on the second storage device; and
   a processor that receives results of the query from the natural language speech processor, and either conveys the results of the query to a user utilizing a user interface or sends navigation commands to the receiver.

2. The receiver remote controller according to claim 1, wherein the user interface further comprises a display on the remote controller.

3. The receiver remote controller according to claim 1, wherein the remote controller is in communication with the television receiver device, and wherein the user interface displays results of the query on a display of the television receiver device.

4. The receiver remote controller according to claim 1, further comprising a remote command transmitter that transmits a command from the remote controller, such command comprising a program selection selected by manual or voice input via the user interface as a result of the query.

5. The receiver remote controller according to claim 1, wherein the data interface comprises a wireless or wired interface that couples data from the television receiver device to the remote controller.

6. The receiver remote controller according to claim 1, wherein the data interface comprises a wireless interface for issuing commands to the television receiver device.

7. The receiver remote controller according to claim 1, wherein the EPG data are updated on a periodic basis by communication with the first storage device.

8. The receiver remote controller according to claim 1, wherein the first storage device receives updates of the EPG database from the Internet.

9. The receiver remote controller according to claim 1, wherein the first storage device is part of a television set.

10. The receiver remote controller according to claim 1, further comprising means for signaling to the remote controller that the speech input is to be interpreted as an EPG query or command.

11. The receiver remote controller according to claim 1, wherein the television receiver device comprises one of a cable set-top box, satellite set-top box, IPTV set-top box, broadcast TV adapter, and broadcast television receiver.

12. A receiver remote controller, comprising in combination:
   the remote controller being contained in a remote controller housing containing:
   a storage device storing an electronic program guide (EPG) database that relates content to receiver channels containing said content;
   a wired or wireless data interface to a television receiver device that receives the EPG database from an EPG database external to the housing and forming part of or connected to the television receiver device for storage in the storage device;
   a user interface including a local or receiver display;
   a speech interface that receives speech input and converts the speech input to a speech signal;
   a remote controller processor that determines under program control that the speech input is to be interpreted as an EPG query;
   a natural language speech processor engine receiving the speech signal and creating a query of the remote controller EPG database;
   the processor receiving results of the query from the natural language speech processor and conveying the results of the query to a user utilizing the user interface; and
   a remote command transmitter that transmits a command from the remote controller, such command comprising a program selection selected by manual or voice input via the user interface as a result of the query.

13. The receiver remote controller according to claim 12, wherein the remote controller is in communication with a television receiver display, and wherein the television receiver display displays results of the query.

14. The receiver remote controller according to claim 12, wherein the EPG data are updated on a periodic basis by connection to the television receiver device.

15. A method of processing electronic program guide (EPG) queries, comprising:
   receiving electronic program guide EPG data from an EPG data source forming a part of or connected to a television receiver device;
   storing EPG data in a data storage device within the remote controller, the EPG relating content to television channels containing said content;
   in a remote controller:
   receiving speech input at a speech input of the remote controller;
   at a natural language speech processor engine within the remote controller, receiving the speech input and translating the speech input to a query of the EPG stored in the data storage device; and
   at a processor within the remote controller, receiving results of the query from the natural language speech processor and either conveying the results of the query to a user utilizing a user interface or transmitting navigation commands to a receiver.

16. The method according to claim 15, further comprising displaying the results of the query on a display forming a part of the remote controller.

17. The method according to claim 15, wherein the remote controller is in communication with the television receiver device, and further comprising producing a display of results of the query on a television display forming a part of the television receiver device.

18. The method according to claim 15, further comprising transmitting a command from the remote controller, such command comprising a program selection selected by manual or voice input via the user interface as a result of the query.

19. The method according to claim 15, wherein EPG data is coupled from the television receiver device to the remote controller via a wireless or wired interface.

20. The method according to claim 19, wherein the EPG data source forms a part of a television set.

21. The method according to claim 15, further comprising updating EPG data on a periodic basis by communication with the EPG data source.

22. The method according to claim 15, further comprising receiving a speech signal at the remote controller that indicates that subsequent speech input is to be interpreted as an EPG query or command.

* * * * *